United States Patent
Lee et al.

(10) Patent No.: US 8,587,920 B2
(45) Date of Patent: Nov. 19, 2013

(54) MULTILAYER CERAMIC ELECTRONIC COMPONENT AND METHOD FOR MANUFACTURING THE SAME

(75) Inventors: Jae Joon Lee, Seoul (KR); Jae Yeol Choi, Gyeonggi-do (KR); Hyoung Wook Lim, Gyeonggi-do (KR); Sung Chul Bae, Gyeonggi-do (KR)

(73) Assignee: Samsung Electr-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/480,129

(22) Filed: May 24, 2012

(65) Prior Publication Data

US 2012/0307415 A1 Dec. 6, 2012

(30) Foreign Application Priority Data

May 31, 2011 (KR) .................. 10-2011-0052070

(51) Int. Cl.
    *H01G 4/30* (2006.01)
(52) U.S. Cl.
    USPC ............... 361/301.4; 361/301.2; 361/306.1; 361/306.3; 361/308.1; 361/321.2
(58) Field of Classification Search
    USPC .............. 361/301.4, 306.1, 306.3, 301.2, 361/311–313, 321.1, 321.2, 308.1, 303–305
    See application file for complete search history.

(56) References Cited

U.S. PATENT DOCUMENTS

| | | | | |
|---|---|---|---|---|
| 5,812,363 | A * | 9/1998 | Kuroda et al. | 361/306.3 |
| 6,118,647 | A * | 9/2000 | Okinaka et al. | 361/305 |
| 6,525,395 | B1 * | 2/2003 | Kawase et al. | 257/528 |
| 7,061,747 | B2 * | 6/2006 | Togashi et al. | 361/306.3 |
| 7,295,420 | B2 * | 11/2007 | Kojima et al. | 361/306.3 |
| 7,319,582 | B2 * | 1/2008 | Takashima et al. | 361/303 |
| 7,436,650 | B2 * | 10/2008 | Oguni et al. | 361/321.2 |
| 8,107,214 | B2 * | 1/2012 | Aoki | 361/303 |

FOREIGN PATENT DOCUMENTS

| | | |
|---|---|---|
| JP | 2001-035743 | 2/2001 |
| JP | 2001-185440 | 7/2001 |
| KR | 10-2002-0009451 | 2/2002 |

* cited by examiner

*Primary Examiner* — Nguyen T Ha
(74) *Attorney, Agent, or Firm* — McDermott Will & Emery LLP

(57) ABSTRACT

Disclosed herein are a multilayer ceramic electronic component and a method for manufacturing the same. The multilayer ceramic electronic component includes a multilayer body in which dielectric layers and internal electrode layers are alternately stacked and external electrodes, wherein a portion in the internal electrode layers positioned in a marginal portion in which vertically neighboring internal electrode layers in the multilayer body is not overlapped with each other has a thickness thicker than that of a portion of the internal electrode layer positioned in an overlapped portion in which the vertically neighboring internal electrode layers are overlapped with each other, such that an accumulated stepped height difference in the marginal portion is reduced.

18 Claims, 4 Drawing Sheets

US 8,587,920 B2

MULTILAYER CERAMIC ELECTRONIC COMPONENT AND METHOD FOR MANUFACTURING THE SAME

CROSS REFERENCE(S) TO RELATED APPLICATIONS

This application claims the benefit under 35 U.S.C. Section 119 of Korean Patent Application Serial No. 10-2011-0052070, entitled "Multilayer Ceramic Electronic Component and Method for Manufacturing the Same" filed on May 31, 2011, which is hereby incorporated by reference in its entirety into this application.

BACKGROUND OF THE INVENTION

1. Technical Field

The present invention relates to a multilayer ceramic electronic component and a method for manufacturing the same, and more particularly, to a multilayer ceramic electronic component in which a portion of an internal electrode pattern in a section in which vertically neighboring internal electrode layers are not overlapped with each other has a thickness thicker than those of the other portion of the internal electrode pattern, and a method for manufacturing the same.

2. Description of the Related Art

In a multilayer ceramic condenser (MLCC), which is a multilayer ceramic electronic component, a technology of increasing capacitance capable of being implemented per unit volume to thereby reduce a size of the multilayer ceramic condenser and increase a capacitance thereof has been developed.

The MLCC is manufactured as follows. A slurry in which dielectric powders and additives are mixed is formed on a film to thereby manufacture a uniform dielectric sheet. An internal electrode is printed on the dielectric sheet according to a desired pattern to thereby manufacture a printing sheet. The printing sheet is cut to have a predetermined size and is then stacked to thereby form a stack bar. Next, the stack bar is compressed and then cut according to individual chip sizes. A cut green chip is subjected to baking-out and firing to thereby become a fired chip. Next, an external electrode is formed and plating and packaging is then performed to thereby complete the MLCC.

The MLCC, which is the multilayer ceramic electronic component according to the related art, will be described with reference to FIG. 7 showing a cross section of a multilayer body of the multilayer ceramic electronic component according to the related art.

The MLCC is manufactured by stacking several layers of printing sheets in which pastes for an internal electrode 30 are printed on ceramic dielectric sheets 10 and firing them as shown in FIG. 7. The stacked internal electrode layers 10 need to alternately contact external electrodes (not shown) formed on both sides of the MLCC so that they have different polarities. Therefore, spaces in which the electrodes are not printed, that is, steps or step gaps G are formed in a marginal portion M in an L direction (a length direction), as shown in FIG. 7. These steps G are partially alleviated in subsequent stacking and compressing processes. However, ultimately, they have lower density as compared to an overlapped section and become a main cause of crack generation due to stress in a subsequent process.

Particularly, in accordance with the trend toward the MLCC having a small size and a high capacitance, the stacked number has increased. Therefore, owing to an increase in accumulated stepped height difference in the marginal portion M shown in FIG. 7, in the subsequent process, a crack is easily generated due to the increased stress.

In order to solve this problem, a method for depressing the marginal portion M by enhancing compression at the time of compression of the marginal portion M in order to alleviate the accumulated stepped height difference in the marginal portion M has been used.

Meanwhile, a method for printing dielectric pastes in the marginal portion at a thickness that is the same as or lower than a thickness of the printed internal electrode layer in order to overcome the step in the marginal portion has been suggested in Korean Patent Laid-Open Publication No. 2002-0009451.

In the case of the method for depressing the marginal portion M by enhancing compression of the methods suggested in order to alleviate the accumulated stepped height difference in the marginal portion as described above, when compression excessively increases, a cutting defect due to deformation of a bar may increase. Further, in the method for depressing the marginal portion M by enhancing compression, the electrode and the dielectric in the overlapped portion are deformed and/or extended, such that electrical characteristics such as IR or BDV and reliability are deteriorated. As a result, a scheme of overcoming the accumulated stepped height difference through the enhancement of the compression has a limitation.

Meanwhile, the method suggested in the Korean Patent Laid-Open Publication No. 2002-0009451 may be effective in overcoming the step to thereby suppress the crack generation. However, separate dielectric pastes having a viscosity appropriate for printing and having solid contents appropriate for controlling a contraction percentage are required, and design of a pattern for dielectric printing becomes complicated for precise printing.

Therefore, a basic solution for the problem due to the accumulated stepped height difference in the marginal portion has been demanded.

SUMMARY OF THE INVENTION

An object of the present invention is to provide a multilayer ceramic electronic component in which a lay down value (LD) of internal electrode pastes in a marginal portion in an L direction (a length direction) is increased in order to alleviate an accumulated stepped height difference generated in the marginal portion in the L direction (a length direction) to thereby reduce crack generation, such that the crack generation due to the accumulated stepped height difference in a subsequent process is reduced, and a method for manufacturing the same.

According to an exemplary embodiment of the present invention, there is provided a multilayer ceramic electronic component, including: a multilayer body including a plurality of dielectric layers and a plurality of internal electrode layers that are alternately stacked therein; and external electrodes formed on both sides of the multilayer body, wherein the multilayer body includes a central overlapped portion corresponding to a section in which vertically neighboring internal electrode layers are overlapped with each other and both marginal portions corresponding to both side sections in which the vertically neighboring internal electrode layers are not overlapped with each other while being alternately connected to the external electrodes formed on both sides of the multilayer body, and a portion of each internal electrode layer positioned in each marginal portion is formed to have a thickness thicker than that of a portion of the internal electrode layer positioned in the overlapped portion, such that an accumulated stepped height difference in the marginal portion is reduced.

The portion of the internal electrode layer positioned in the marginal portion may have a thickness that is in a range of approximately 105 to 200% with respect to a thickness of the portion of the internal electrode layer positioned in the overlapped portion.

The portion of the internal electrode layer positioned in the marginal portion may have a width narrower than that of the portion of the internal electrode layer positioned in the overlapped portion.

The portion of the internal electrode layer positioned in the marginal portion may have a width that is in a range of approximately 50 to 90% with respect to a width of the portion of the internal electrode layer positioned in the overlapped portion.

According to another exemplary embodiment of the present invention, there is provided a method for manufacturing a multilayer ceramic electronic component including a multilayer body including a plurality of dielectric layers and a plurality of internal electrode layers that are alternately stacked therein and external electrodes formed on both sides of the multilayer body, the method including: forming the multilayer body so that the dielectric layers and the internal electrode layers are alternately stacked therein, wherein the forming of the multilayer body includes preparing dielectric sheets and printing internal electrode patterns on the dielectric sheets, wherein the printing of the internal electrode patterns includes printing the internal electrode patterns so that a portion of each internal electrode pattern being not to be overlapped with vertically neighboring other internal electrode layer in the multilayer body while being alternately connected to external electrodes formed on both sides of the multilayer body has a thickness thicker than that of a portion of the internal electrode pattern being to be overlapped with the vertically neighboring internal electrode layer.

The printing of the internal electrode patterns may include printing the internal electrode patterns so that the portion of the internal electrode pattern being not to be overlapped has a width narrower than that of the portion of the internal electrode pattern being to be overlapped so as to have a thickness thicker than that of the portion of the internal electrode pattern being to be overlapped.

The printing of the internal electrode patterns may include printing the internal electrode patterns so that the portion of the internal electrode pattern being not to be overlapped has a reduced width that is in a range of approximately 50 to 90% with respect to a width of the portion of the internal electrode pattern being to be overlapped.

The printing of the internal electrode patterns may include printing the internal electrode patterns so that the portion of the internal electrode pattern being not to be overlapped has the narrow width so as to have a thickness, that is in a range of approximately 105 to 200% with respect to that of the portion of the internal electrode pattern being to be overlapped, after being printed and dried.

The printing of the internal electrode patterns may include primarily printing and drying all of each internal electrode pattern on each dielectric sheet, additionally printing and drying the internal electrode pattern only in the portion of the internal electrode pattern being not to be overlapped so that the portion of the internal electrode pattern being not to be overlapped has a thickness thicker than that of the other portion of the internal electrode pattern.

The additionally printing of the internal electrode pattern may include printing the internal electrode patterns only in the portion of the internal electrode pattern being not to be overlapped using a paste containing a reduced metal content.

The additionally printing of the internal electrode pattern may include screen printing the internal electrode patterns only in the portion of the internal electrode pattern being not to be overlapped by changing at least one of a pattern, a mesh, and an emulsion film thickness as a screen condition and an impression pressure, a printing speed, a squeegee angle, and a snap-off as a printing operating condition.

The additionally printing of the internal electrode pattern may include additionally printing the internal electrode patterns so that after the additionally printing and drying, the portion of the internal electrode pattern being not to be overlapped has a thickness that is in a range of approximately 105 to 200% with respect to a thickness of the other portion of the internal electrode pattern after the primarily printing and drying.

The printing of the internal electrode patterns may include printing the internal electrode patterns so that the portion of the internal electrode pattern being not to be overlapped has a thickness thicker than that of the portion of the internal electrode pattern being to be overlapped using a screen having a screen emulsion film thickness corresponding to a section in which the portion of the internal electrode pattern is overlapped with the vertically neighboring internal electrode layer and the other different screen emulsion film thickness corresponding to the other section in which the other portion of the internal electrode pattern is not overlapped.

The printing of the internal electrode patterns may include screen printing the internal electrode patterns using a screen having the screen emulsion film thickness corresponding to the non-overlapped section that is in a range of approximately 105 to 200% with respect to the other screen emulsion film thickness corresponding to the overlapped section.

The method may further include forming a structure in which a plurality of dielectric sheets having the internal electrode patterns printed thereon are stacked and compressing the structure.

The method may further include printing a plurality of internal electrode patterns on a single dielectric sheet, compressing a structure in which a plurality of dielectric sheets having the plurality of internal electrode patterns printed thereon are stacked, the method further comprises cutting the compressed structure so that the external electrodes are formed on both sides thereof.

DESCRIPTION OF THE PREFERRED EMBODIMENTS

Figure 1:
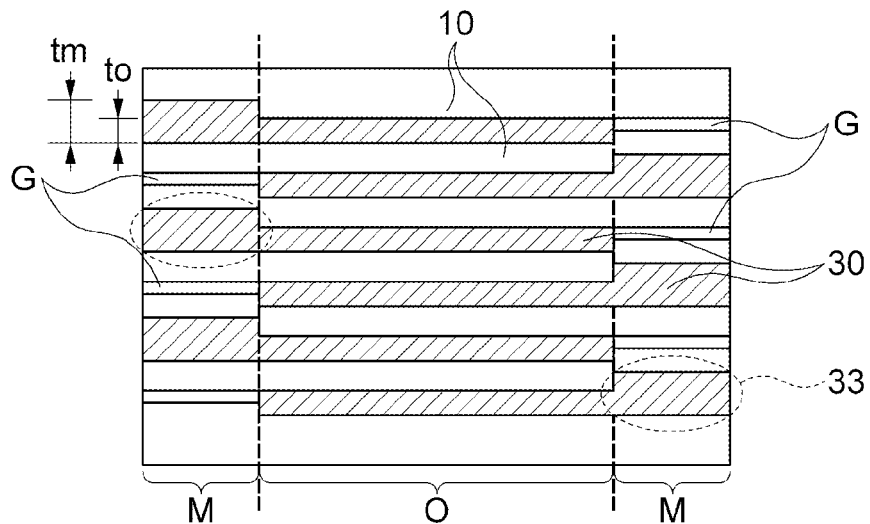
FIG. 1 is a cross-sectional view schematically showing a multilayer body of a multilayer ceramic electronic component according to an exemplary embodiment of the present invention.

Although not specifically stated as an aspect of the present invention, exemplary embodiments of the present invention according to possible various combinations of above-mentioned technical characteristics may be obviously implemented by those skilled in the art.

Exemplary embodiments of the present invention for accomplishing the above-mentioned objects will be described with reference to the accompanying drawings. In describing exemplary embodiments of the present invention, the same reference numerals will be used to describe the same components and an additional description that is overlapped or allow the meaning of the present invention to be restrictively interpreted will be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween.

Although a singular form is used in the present description, it may include a plural form as long as it is opposite to the concept of the present invention and is not contradictory in view of interpretation or is used as clearly different meaning. It should be understood that "include", "have", "comprise", "be configured to include", and the like, used in the present description do not exclude presence or addition of one or more other characteristic, component, or a combination thereof.

Hereinafter, a multilayer ceramic electronic component and a method for manufacturing the same according to exemplary embodiments of the present invention will be described in detail with reference to the accompanying drawings.

Figure 2:
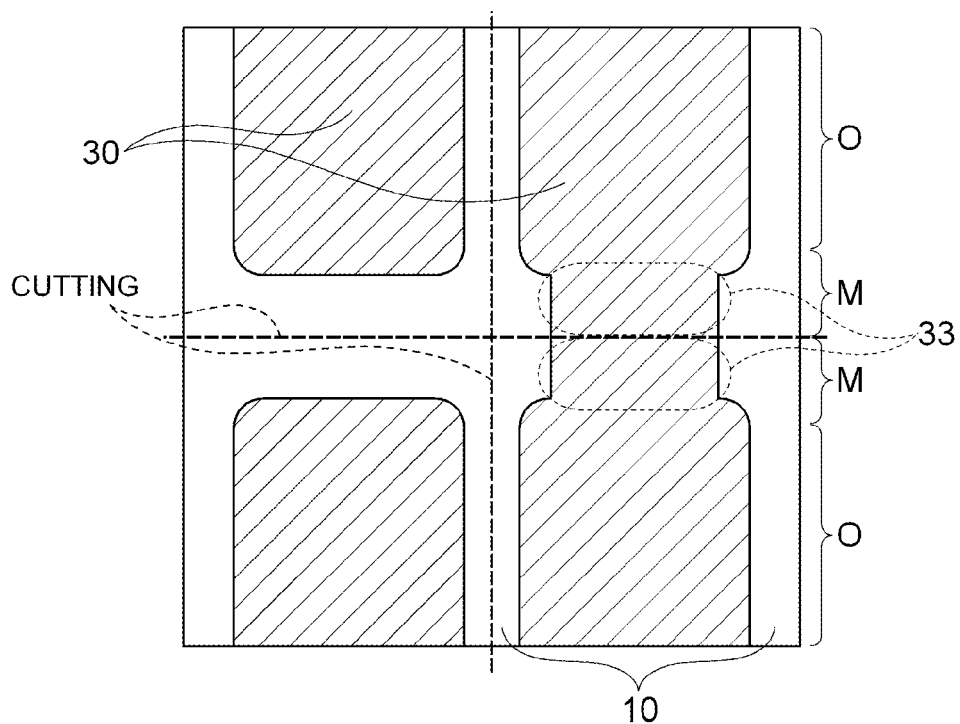
FIG. 2 is a view schematically showing a shape in which internal electrode patterns are printed on dielectric sheets in a method for manufacturing a multilayer ceramic electronic component according to an exemplary embodiment of the present invention.

FIG. 1 is a cross-sectional view schematically showing a multilayer body of a multilayer ceramic electronic component according to an exemplary embodiment of the present invention; FIG. 2 is a view schematically showing a shape in which internal electrode patterns are printed on dielectric sheets in a method for manufacturing a multilayer ceramic electronic component according to an exemplary embodiment of the present invention; and FIGS. 3 to 6 are flow charts schematically showing a method for manufacturing a multilayer ceramic electronic component according to an exemplary embodiment of the present invention.

First, referring to FIG. 1, a multilayer ceramic electronic component according to an exemplary embodiment of the present invention will be describe in detail.

A multilayer ceramic electronic component according to the present exemplary embodiment is configured to include a multilayer body in which dielectric layers 10 and internal electrode layers 30 are alternately stacked and external electrodes (not shown). FIG. 1 shows a multilayer body in which the dielectric layers 10 and the internal electrode layers 30 are alternately stacked. More specifically, FIG. 1 schematically shows a cross section of the multilayer body in a length direction (an L direction). Although not shown, the external electrodes are formed on both sides of the multilayer body.

In the multilayer body, a plurality of dielectric layers 10 and a plurality of internal electrode layers 30 are alternately stacked. Referring to FIG. 1, the multilayer body includes an overlapped portion O formed at a central portion thereof and marginal portions M formed at both sides thereof. The overlapped portion O is a section in which vertically neighboring internal electrode layers 30 are overlapped with each other. The marginal portions M are sections in which the vertically neighboring internal electrode layers 30 are not overlapped with each other while being alternately connected to the external electrodes (not shown) formed on both sides of the multilayer body so that they have different polarities.

As shown in FIG. 1, a portion 33 of the internal electrode layer or an internal electrode pattern positioned in the marginal portion M has a thickness thicker than that of a portion of the internal electrode layer or an internal electrode pattern positioned in the overlapped portion O. In FIG. 1, a lay down value (LD) (a thickness of an internal electrode pattern printing layer converted into a thickness of pure nickel) increases in the marginal portion M in the L direction. The LD may be calculated by measuring weight of printed pastes. Alternatively, the LD may be measured through an X-ray fluorescence (XRF) analysis. For example, in an MLCC using nickel as a material of an internal electrode, the LD may be obtained by converting a printing thickness of nickel pastes into a thickness of pure nickel using a change in intensity of fluorescence X-ray obtained according to a thickness of a pure nickel metal in XRF measurement.

In FIG. 1, a reference sign 'tm' indicates a thickness of the portion 33 of the internal electrode layer or the internal electrode pattern positioned in the marginal portion M of the multilayer body, and a reference sign 'to' indicates a thickness of the portion of the internal electrode layer or the internal electrode pattern positioned in the overlapped portion O of the multilayer body. Due to a difference between 'tm' and 'to', a step gap G is reduced in the marginal portion M of the multilayer body, such that an accumulated stepped height difference in the marginal portion M of the multilayer body having a multilayer structure is reduced. Due to the reduced accumulated stepped height difference, crack generation caused by stress is significantly reduced in subsequent processes such as a stacking process and a compressing process.

According to the present exemplary embodiment, the accumulated stepped height difference in the marginal portion M is reduced, such that a firing crack generation ratio in the marginal portion M of the multilayer ceramic electronic component is reduced even after compression firing of the multilayer body.

Preferably, another exemplary embodiment of the present invention will be described.

The following Table 1 shows a firing crack generation ratio in an L marginal portion after firing the multilayer body according to an increase ratio of the LD in the L marginal portion in manufacturing the MLCC.

TABLE 1

| Division | LD (μm) in Overlapped Portion | LD(μm) in L Marginal portion | Increase Ratio of LD in L Marginal portion | Firing Crack Generation Ratio (ppm) in L Marginal portion |
|---|---|---|---|---|
| Reference Example | 0.51 | 0.51 | 100% | 3,170 |

TABLE 1-continued

| Division | LD (μm) in Overlapped Portion | LD(μm) in L Marginal portion | Increase Ratio of LD in L Marginal portion | Firing Crack Generation Ratio (ppm) in L Marginal portion |
|---|---|---|---|---|
| Comparative Example 1 | 0.50 | 0.52 | 103% | 3,068 |
| Comparative Example 2 | 0.48 | 0.52 | 108% | 1,160 |
| Comparative Example 3 | 0.50 | 0.75 | 149% | 205 |
| Comparative Example 4 | 0.50 | 0.98 | 196% | 1,502 |
| Comparative Example 5 | 0.52 | 1.12 | 215% | 17,660 |

In Table 1, Reference Example indicates a firing crack generation ratio in an L marginal portion according to the related art in which LDs in a marginal portion in an L direction (an L marginal portion) and an overlapped portion are the same as each other, and Comparative Examples 1 to 5 indicate a firing crack generation ratio in an L marginal portion in a case in which the LD in a L marginal portion M is increased, as compared to the LD in an overlapped portion O. The firing crack generation ratio in the L marginal portion, which is in units of ppm, indicates a value corresponding to the number of firing crack generation per million. The increase ratio of the LD in the L marginal portion indicates a percentage of the LD in the L marginal portion M to the LD in the overlapped portion O.

As shown in Table 1, it may be appreciated that when the LD in the L marginal portion increases until it is close to 200%, the firing crack generation ratio in Comparative Examples reduces as compared to Reference Example. However, when the increase ratio of the LD in the L marginal portion exceeds 200% such as a case in which it is 215% in Comparative Example 5 of Table 1, the frequency number of the firing crack was significantly increased and a short-circuit defect ratio was also increased. Further, when the increase ratio of the LD in the L marginal portion is slightly increased such as a case in which it is less than approximately 105%, for example, 103% in Comparative Example 1 of Table 1, an effect of reducing the firing crack generation was slight. Referring to Table 1, it may be appreciated that when the increase ratio of the LD in the L marginal portion is about 150% as shown in Comparative Example 3, the firing crack generation ratio was significantly improved.

Referring to Table 1, in the exemplary embodiment of the present invention, the portion 33 of the internal electrode layer positioned in the marginal portion of the multilayer body has the thickness tm that is in a range of approximately 105 to 200% with respect to the thickness to of the portion of the internal electrode layer 30 positioned in the overlapped portion thereof. When the increase ratio of the LD in the L marginal portion is less than approximately 105% with respect to the LD in the overlapped portion, a firing crack generation ratio improvement effect, which is an effect of the present invention, may not be sufficiently obtained, and when the increase ratio of the LD in the L marginal portion exceeds approximately 200%, the firing crack generation ratio is increased due to an increase in thickness of the L marginal portion at the time of stacking and the dielectric layer 10 is excessively bent, such that electrical characteristics and reliability of the MLCC may be lowered. In addition, when the increase ratio of the LD exceeds approximately 200%, the step G is further intensified, such that interlayer delamination of the multilayer body may be generated.

Next, an exemplary embodiment of the present invention will be described with reference to FIG. 2. FIG. 2 schematically shows a shape in which internal electrode patterns are printed on dielectric sheets. Referring to FIG. 2, the portion 33 of the internal electrode layer positioned in the marginal portion M of the multilayer body has a width narrower than that of the portion of the internal electrode layer positioned in the overlapped portion O thereof. For example, when the internal electrode pattern 30 is printed, a printing width in the L marginal portion is reduced in the internal electrode pattern 30, thereby making it possible to increase the LD in the L marginal portion. Preferably, in the present exemplary embodiment, saddle portions of both edge portions having a narrowly formed width in the portion 33 of the internal electrode layer positioned in the marginal portion M are at least partially overlapped with each other, such that the portion 33 of the internal electrode layer positioned in the marginal portion M has a width thicker than that of the portion of the internal electrode layer positioned in the overlapped portion O. According to the present exemplary embodiment, the firing crack generation ratio in the marginal portion M is reduced.

Preferably, according to another exemplary embodiment of the present invention, the portion 33 of the internal electrode layer positioned in the marginal portion M of the multilayer body is formed to have a width in a range of approximately 50 to 90% with respect to the width of the portion of the internal electrode layer positioned in the overlapped portion O thereof.

Hereinafter, a method for manufacturing a multilayer ceramic electronic component according to other exemplary embodiments of the present invention will be described with reference to FIGS. 2 to 6. According to the other exemplary embodiments of the present invention, a method for manufacturing a multilayer ceramic electronic component including a multilayer body in which a plurality of dielectric layers 10 and a plurality of internal electrode layers 30 are alternately stacked and external electrodes (not shown) formed on both sides of the multilayer body will be described. In describing the method for manufacturing a multilayer ceramic electronic component according to the other exemplary embodiments of the present invention, a description of the multilayer ceramic electronic component according to the above-mentioned exemplary embodiment of the present invention will be referred.

Figure 3:
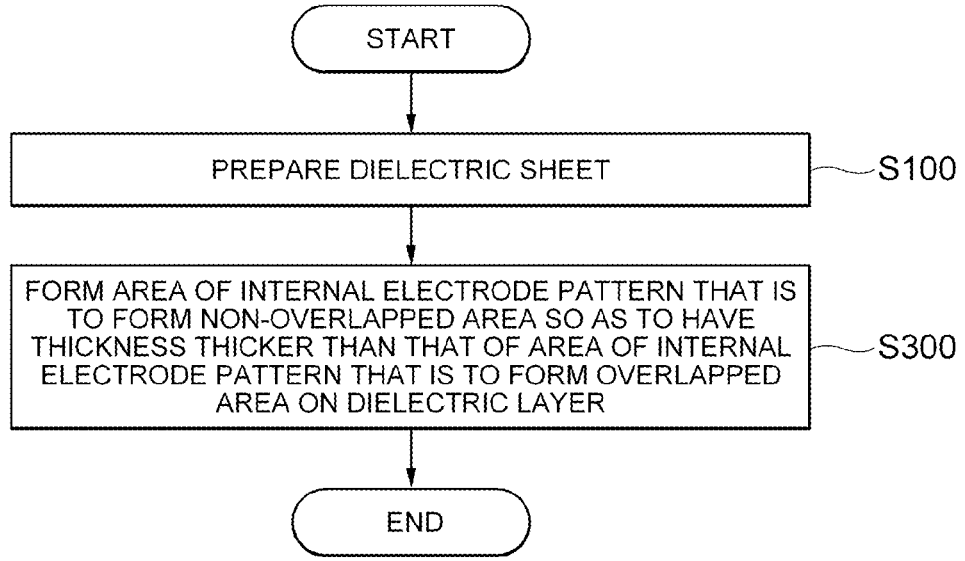
FIG. 3 is a flow chart schematically showing a method for manufacturing a multilayer ceramic electronic component according to an exemplary embodiment of the present invention.

FIG. 3 shows a process of forming a multilayer body in the method for manufacturing a multilayer ceramic electronic component according to the exemplary embodiment of the present invention in detail.

Referring to FIG. 3, the method for manufacturing a multilayer ceramic electronic component according to the exemplary embodiment of the present invention includes a process of forming a multilayer body in which dielectric layers 10 and internal electrode layers 30 are alternately stacked. The process of forming a multilayer body includes preparing dielectric sheets 10 (S100) and printing internal electrode patterns 30 on the dielectric sheets (S300).

The printing of the internal electrode patterns 30 includes printing the internal electrode patterns 30 so that a portion 33 of the internal electrode patterns that is to form a portion (an L marginal portion) in which vertically neighboring internal electrode layers 30 in the multilayer body is not overlapped with each other while being alternately connected to external electrodes (not shown) formed on both sides of the multilayer body has a thickness thicker than that of a portion of the internal electrode pattern that is to form a portion in which the vertically neighboring internal electrode layers 30 in the multilayer body are overlapped with each other (S300).

When an LD of the L marginal portion is increased as compared to the overlapped portion O using the method for manufacturing a multilayer ceramic electronic component according to the present exemplary embodiment, crack generation due to an accumulated stepped height difference in the L marginal portion after firing may be reduced.

As a method of allowing the internal electrode layers 30 or the internal electrode patterns 30 in the L marginal portion to have a thickness tm thicker than a thickness to of the internal electrode layers 30 or the internal electrode patterns 30 in the overlapped portion, several methods may be used. A specific method will be described with reference to the following exemplary embodiment.

Next, a method for manufacturing a multilayer ceramic electronic component according to the exemplary embodiment of the present invention will be described in detail with reference to FIGS. 2 and 4. FIG. 2 schematically shows a shape in which internal electrode patterns 30 are printed on dielectric sheets 10 in a method for manufacturing a multilayer ceramic electronic component; and FIG. 4 shows a process of forming a multilayer body in the method for manufacturing a multilayer ceramic electronic component.

Figure 4:
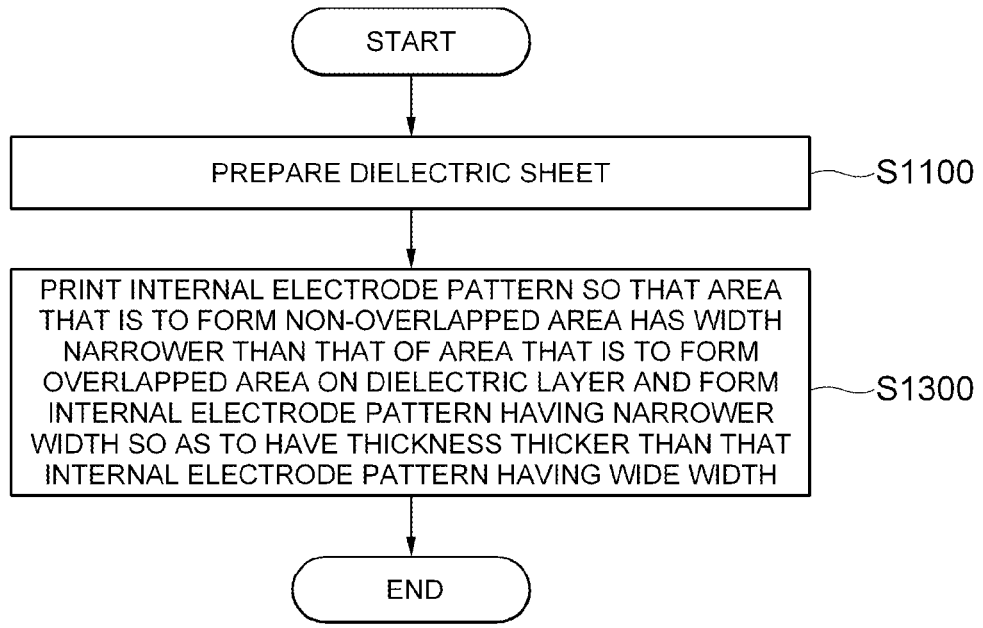
FIG. 4 is a flow chart schematically showing a method for manufacturing a multilayer ceramic electronic component according to another exemplary embodiment of the present invention.

Referring to FIG. 4, the printing of the internal electrode patterns 30 includes printing the internal electrode patterns so that the portion 33 of the internal electrode patterns that is to form a non-overlapped portion (an L marginal portion) has a width narrower than that of the portion of the internal electrode pattern that is to form an overlapped portion. The internal electrode patterns 30 are printed to have a narrower width in the portion 33 of the internal electrode patterns that is to form the non-overlapped portion, such that the portion 33 of the internal electrode patterns that is to form the non-overlapped portion may have a thickness thicker than that of the portion of the internal electrode pattern being to be overlapped.

When the internal electrode pattern 30 is printed using pastes, a printing portion in the L marginal portion in the internal electrode pattern 30, more specifically, a printing portion or a printing width per unit length is reduced, thereby making it possible to increase the LD in the L marginal portion. For example, in screen printing, saddle portions in which a printing application amount is increased in the vicinity of an edge portion of a printed surface as compared to a central portion thereof with respect to the entire printing portion are generated. Therefore, when a printing width of the internal electrode pattern in the L marginal portion is reduced, the saddle portions of the edge portion at both ends of the width after printing may be overlapped with each other. Therefore, a printing thickness tm at the L marginal portion may be increased by a predetermined degree without performing multi-printing, or the like. Preferably, according to the present exemplary embodiment, the internal electrode patterns 30 are printed to have a reduced width in the L marginal portion so that the saddle portions of both edge portions of a width in the portion 33 of the internal electrode patterns that is to form the non-overlapped portion, that is, a printing width of the internal electrode pattern in the L marginal portion are at least partially overlapped with each other.

For example, in Comparative Example 2 in Table 1, a scheme according to the present exemplary embodiment has been applied. An increase in printing thickness tm in the L marginal portion due to a reduction in printing width of the internal electrode pattern in the L marginal portion may be accomplished by controlling a viscosity of a paste, surface tension of the paste, a printing width in the L marginal portion, a paste printing thickness, or the like. That is, the viscosity of a paste is increased, the paste having large surface tension is used, or the printing width in the L marginal portion is reduced to increase a portion in which the saddle portions are overlapped with each other, thereby making it possible to increase the printing thickness tm in the L marginal portion. In addition, the printing thickness tm in the L marginal portion may be increased through multi-printing such as double-printing or the use of screens having different emulsion film thicknesses as in the following exemplary embodiment of the present invention as well as the reduction in printing width of the internal electrode pattern in the L marginal portion.

Preferably, according to the exemplary embodiment of the present invention, the internal electrode patterns are printed to have a reduced width in the portion 33 of the internal electrode patterns that is to form the non-overlapped portion so that the portion 33 of the internal electrode patterns that is to form the non-overlapped portion (the L marginal portion) after printing and drying the internal electrode patterns has a thickness tm that is in a range of approximately 105 to 200% with respect to a thickness to of the portion of the internal electrode pattern being to be overlapped after printing and drying the internal electrode patterns.

Preferably, another exemplary embodiment will be described. In the present exemplary embodiment, the internal electrode patterns are printed so that the portion 33 of the internal electrode patterns that is to form the non-overlapped portion has a reduced width that is in a range of approximately 50 to 90% with respect to a width of the portion of the internal electrode pattern being to be overlapped. When the portion 33 of the internal electrode patterns that is to form the non-overlapped portion has a width exceeding 90% with respect to a width of the portion of the internal electrode pattern being to be overlapped, a reduction in printing width is slight, such that the saddle portions may not be overlapped with each other. In addition, when the portion 33 of the internal electrode patterns that is to form the non-overlapped portion has an excessively reduced width, a portion capable of contacting the external electrode is excessively reduced, such that it is difficult to implement capacitance. Further, when the printing width is excessively narrow, it is difficult to perform uniform printing.

Next, another exemplary embodiment of the present invention will be described with reference to FIG. 6.

Figure 6:
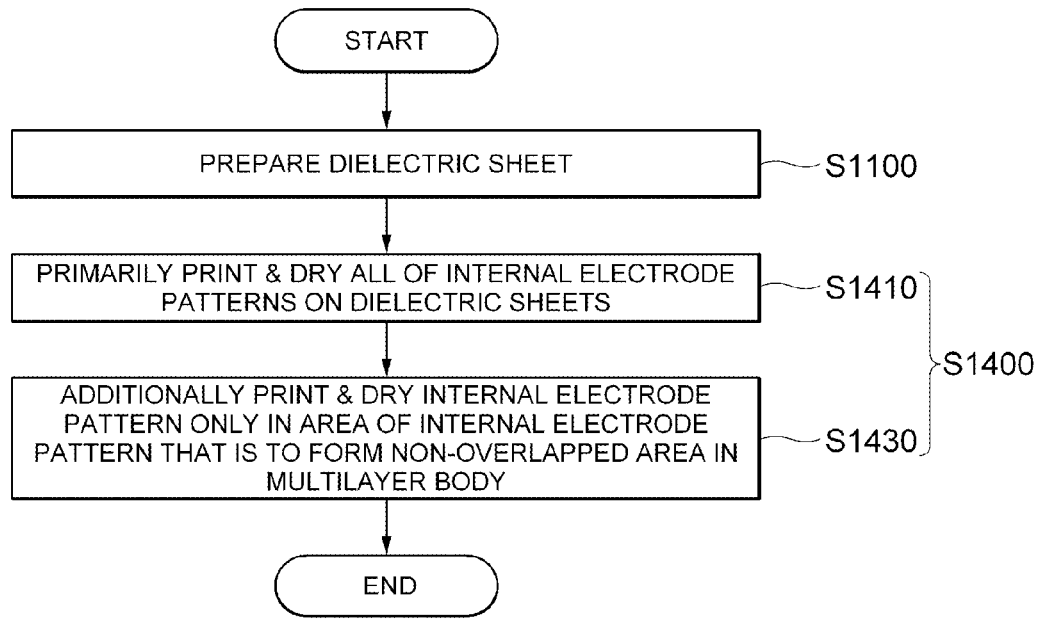
FIG. 6 is a flow chart schematically showing a method for manufacturing a multilayer ceramic electronic component according to another exemplary embodiment of the present invention.
Figure 7:
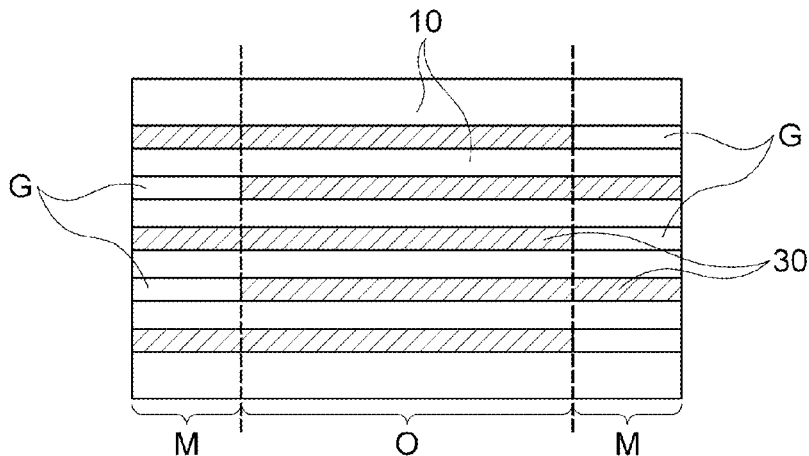
FIG. 7 is a cross-sectional view schematically showing the multilayer body of the multilayer ceramic electronic component according to the related art.

Referring to FIG. 6, printing internal electrode patterns 30 (S1400) includes primarily printing and drying the internal electrode patterns 30 (S1410) and additionally printing and drying the internal electrode pattern 30 (S1430). In the primary printing, all of the internal electrode patterns 30 are printed and dried on the dielectric sheets 10 (S1410). After the internal electrode patterns 30 are primarily printed and dried, they are additionally printed and dried only in the portion 33 of the internal electrode patterns that is to form the non-overlapped portion (S1430). In the additional printing (S1430), a screen designed so that the internal electrode patterns 30 may be printed only in the L marginal portion corresponding to the portion 33 of the internal electrode patterns that is to form the non-overlapped portion is used. Preferably, in the additional printing, the same paste as the paste used in the primary printing is used. Here, a metal content contained in the paste may change according to adjustment of an increase ratio of the LD after drying subsequent to the additional printing. The portion 33 of the internal electrode patterns that is to form the non-overlapped portion is formed to have a thickness thicker than that of the other portion of the internal electrode pattern through the additional printing.

Preferably, according to the exemplary embodiment of the present invention, at the time of the additional printing, the internal electrode patterns are printed only in the portion 33 of the internal electrode patterns that is to form the non-overlapped portion using the paste having a reduced metal content. At the time of the additional printing, the metal content in the paste is controlled, thereby making it possible to control the LD to have a desired value.

As a method for controlling the increase ratio of the LD at the time of the additional printing, various methods such as a method of changing a screen condition, a method of changing a printing operation condition, or the like, in addition to a method of controlling the metal content in the paste, may be used.

Preferably, according to the exemplary embodiment of the present invention, at the time of the additional printing, at least one of a pattern, a mesh, and an emulsion film thickness as the screen condition and an impression pressure, a printing speed, a squeegee angle, and a snap-off (a distance between a screen mask and an object to be printed) as the printing operating condition is changed, such that the internal electrode patterns are screen printed only in the portion 33 of the internal electrode patterns that is to form the non-overlapped portion. The emulsion film, which preferably is a film formed under the screen mesh, forms a non-invasive portion of the paste. In the present exemplary embodiment, at the time of the additional printing, the increase ratio of the LD in the L marginal portion is controlled by using screens having different screen conditions and/or changing the printing operation condition.

Preferably, in the exemplary embodiment of the present invention, the internal electrode patterns are additionally printed so that the portion 33 of the internal electrode patterns that is to form the non-overlapped portion the internal electrode patterns after the additional printing and drying of the internal electrode patterns has a thickness tm that is in a range in approximately 105 to 200% with respect to a thickness to of the other portion of the internal electrode pattern after the primary printing and drying internal electrode patterns. For example, in Comparative Examples 3 and 4 in Table 1, a double printing scheme with respect to the portion 33 of the internal electrode pattern 30 corresponding to the L marginal portion has been applied. When the portion 33 of the internal electrode patterns that is to form the non-overlapped portion after the additional printing and drying has a thickness tm exceeding 200% with respect to a thickness to of the other portion of the internal electrode pattern after the primary printing and drying, the step (G) is further intensified, thereby causing interlayer delamination of the multilayer body.

Next, another exemplary embodiment for increasing the thickness tm of the internal electrode layer or the internal electrode pattern in the L marginal portion will be described.

Although not shown, the printing of the internal electrode patterns 30 includes printing the internal electrode patterns so that the portion 33 of the internal electrode patterns that is to form the non-overlapped portion has a thickness (tm) thicker than a thickness to of the portion of the internal electrode pattern being to be overlapped using screens having a screen emulsion film thickness corresponding to a section O in which vertically neighboring internal electrode layers 30 in a multilayer body are overlapped with each other different from a screen emulsion film thickness corresponding to a section M in which the vertically neighboring internal electrode layers 30 in the multilayer body are not overlapped with each other.

Preferably, according to another exemplary embodiment of the present invention, the internal electrode patterns are screen printed using a screen having the screen emulsion film thickness corresponding to the non-overlapped section M that is in a range of approximately 105 to 200% with respect to a screen emulsion film thickness corresponding to the overlapped section. Therefore, the thickness tm of the portion 33 of the internal electrode layer positioned in the L marginal portion may be maintained so as to be in a range of approximately 105 to 200% with respect to the thickness to of the portion of the internal electrode layer positioned in the overlapped portion.

Next, exemplary embodiments of the present invention will be described with reference to FIG. 5.

Figure 5:
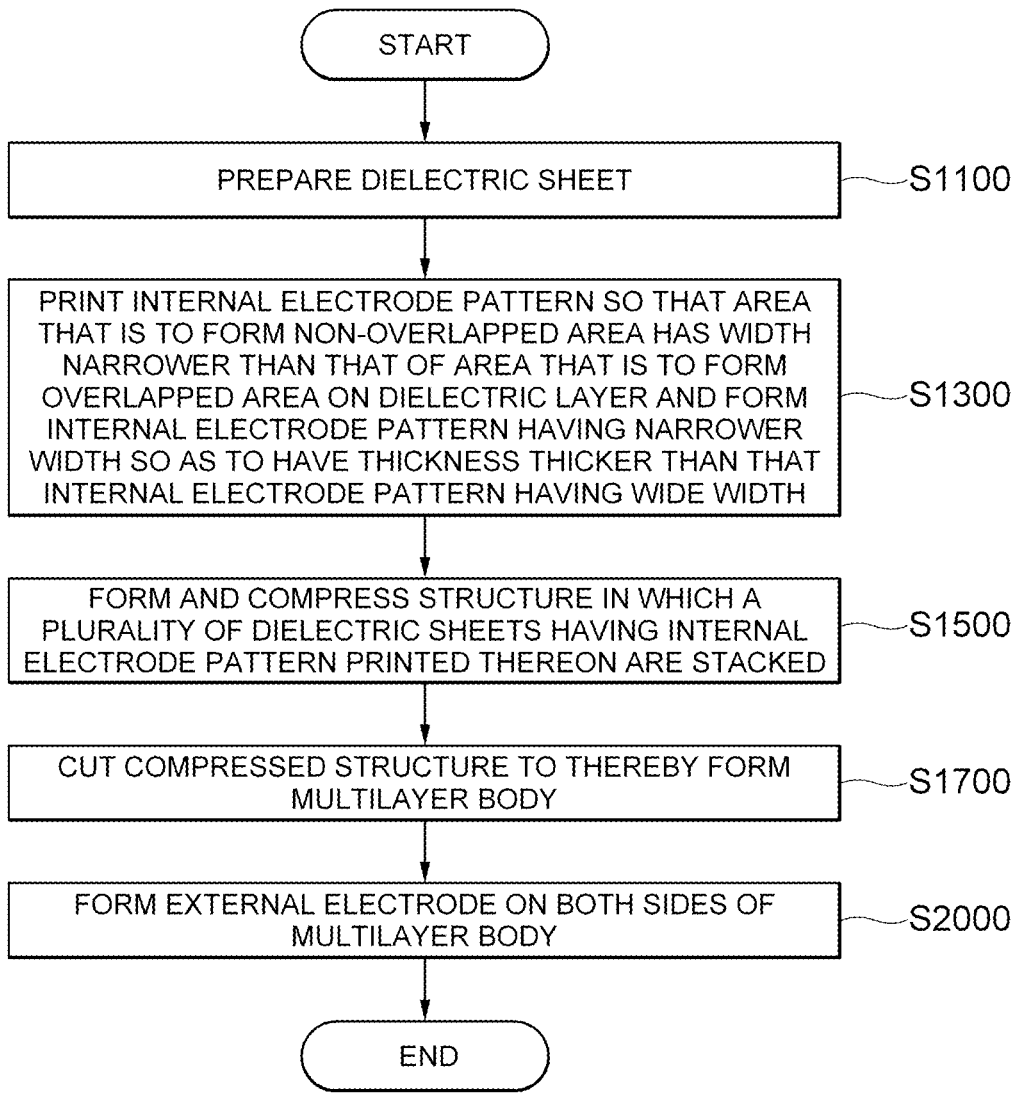
FIG. 5 is a flow chart schematically showing a method for manufacturing a multilayer ceramic electronic component according to another exemplary embodiment of the present invention.

Referring to FIG. 5, according to the exemplary embodiment of the present invention, a structure in which a plurality of dielectric sheets 10 having internal electrode patterns 30 printed thereon are stacked is formed and then compressed (S1500).

FIG. 5 shows a case of forming and compressing the structure in the exemplary embodiment in which the internal electrode patterns in the portion 33 of the internal electrode patterns that is to form the non-overlapped portion are printed to have a narrow width. However, a process of forming and compressing a structure in which a plurality of dielectric sheets 10 having the internal electrode patterns 30 printed thereon are stacked may also be applied in an exemplary embodiment shown in FIG. 6 in which the internal electrode patterns 30 are doubly printed in the L marginal portion, an exemplary embodiment (not shown) in which the screens having different screen emulsion film thicknesses according to the overlapped section O and the margin section M are used, and the like.

As a method of forming the structure in which the plurality of dielectric sheets 10 having the internal electrode patterns 30 printed thereon are stacked, several methods may be used. For example, the internal electrode patterns 30 are printed on the dielectric sheets 10 and the plurality of dielectric sheets 10 having the internal electrode patterns 30 printed therein are stacked, thereby making it possible to form a multilayer body. Alternately, a process of preparing another dielectric sheet 10 on the dielectric sheet 10 having the internal electrode patterns 30 printed thereon and printing the internal electrode patterns 30 on another dielectric sheet 10 is repeatedly performed, thereby making it possible to form a structure in which the plurality of dielectric sheets 10 having the internal electrode patterns 30 printed thereon are stacked.

A method for manufacturing a multilayer ceramic electronic component according to another exemplary embodiment of the present invention will be described with reference to FIG. 5. A plurality of internal electrode patterns 30 are printed on a single dielectric sheet 10, a structure in which a plurality of dielectric sheets 10 having the plurality of internal electrode patterns 30 printed thereon are stacked is compressed, and the compressed structure is then cut so that the external electrodes (not shown) may be formed on both sides thereof (S1700). Referring to FIG. 2, a cutting line cutting the multilayer body so as to be divided into a plurality of multilayer bodies is shown. As described above, the process (S1700) in FIG. 5 may also be applied in the exemplary embodiment in which the internal electrode patterns in the portion 33 of the internal electrode patterns that is to form the non-overlapped portion are printed to have a narrow width, the exemplary embodiment shown in FIG. 6 in which the internal electrode patterns 30 are doubly printed in the L marginal portion, the exemplary embodiment (not shown) in which the screens having the different screen emulsion film thicknesses according to the overlapped section O and the margin section M are used, and the like.

Referring to FIG. 5, the multilayer body cut into the respective multilayer bodies is subjected to a firing process (not shown) and is then subjected to an external electrode forming process (S2000) shown in FIG. 5, such that the multilayer ceramic electronic component is manufactured.

As set forth above, according to the exemplary embodiments of the present invention, in the multilayer ceramic electronic component, the LD in the internal electrode patterns in the marginal portion in the L direction is increased to easily and simply alleviate an accumulated stepped height difference generated in the marginal portion in the L direction, thereby making it possible to reduce crack generation.

In addition, according to the exemplary embodiments of the present invention, the LD in the internal electrode patterns in the marginal portion in the L direction is increased by an increase ratio having a predetermined range as compared to the LD in the internal electrode patterns in the overlapped portion, thereby making it possible to significantly reduce a crack generation ratio after a firing process.

It is obvious that various effects directly stated according to various exemplary embodiment of the present invention may be derived by those skilled in the art from various configurations according to the exemplary embodiments of the present invention.

The accompanying drawings and the above-mentioned exemplary embodiments have been illustratively provided in order to assist in understanding of those skilled in the art to which the present invention pertains rather than limiting a scope of the present invention. Therefore, various exemplary embodiments of the present invention may be implemented in modified forms without departing from an essential feature of the present invention. In addition, a scope of the present invention should be interpreted according to claims and includes various modifications, alterations, and equivalences made by those skilled in the art.

What is claimed is:

1. A multilayer ceramic electronic component, comprising:
   a multilayer body including a plurality of dielectric layers and a plurality of internal electrode layers that are alternately stacked therein; and
   external electrodes formed on both sides of the multilayer body,
   wherein the multilayer body includes a central overlapped portion corresponding to a section in which vertically neighboring internal electrode layers are overlapped with each other and both marginal portions corresponding to both side sections in which the vertically neighboring internal electrode layers are not overlapped with each other while being alternately connected to the external electrodes formed on both sides of the multilayer body, and
   a portion of each internal electrode layer positioned in each marginal portion is formed to have a thickness thicker than that of a portion of the internal electrode layer positioned in the overlapped portion, such that an accumulated stepped height difference in the marginal portion is reduced.

2. The multilayer ceramic electronic component according to claim 1, wherein the portion of the internal electrode layer positioned in the marginal portion has a thickness that is in a range of approximately 105 to 200% with respect to a thickness of the portion of the internal electrode layer positioned in the overlapped portion.

3. The multilayer ceramic electronic component according to claim 2, wherein the portion of the internal electrode layer positioned in the marginal portion has a width narrower than that of the portion of the internal electrode layer positioned in the overlapped portion.

4. The multilayer ceramic electronic component according to claim 3, wherein the portion of the internal electrode layer positioned in the marginal portion has a width that is in a range of approximately 50 to 90% with respect to a width of the portion of the internal electrode layer positioned in the overlapped portion.

5. The multilayer ceramic electronic component according to claim 1, wherein the portion of the internal electrode layer positioned in the marginal portion has a width narrower than that of the portion of the internal electrode layer positioned in the overlapped portion.

6. The multilayer ceramic electronic component according to claim 5, wherein the portion of the internal electrode layer positioned in the marginal portion has a width that is in a range of approximately 50 to 90% with respect to a width of the portion of the internal electrode layer positioned in the overlapped portion.

7. A method for manufacturing a multilayer ceramic electronic component including a multilayer body including a plurality of dielectric layers and a plurality of internal electrode layers that are alternately stacked therein and external electrodes formed on both sides of the multilayer body, the method comprising:
   forming the multilayer body so that the dielectric layers and the internal electrode layers are alternately stacked therein,
   wherein the forming of the multilayer body includes preparing dielectric sheets and printing internal electrode patterns on the dielectric sheets,
   wherein the printing of the internal electrode patterns includes printing the internal electrode patterns so that a portion of each internal electrode pattern being not to be overlapped with vertically neighboring other internal electrode layer in the multilayer body while being alternately connected to external electrodes formed on both sides of the multilayer body has a thickness thicker than that of a portion of the internal electrode pattern being to be overlapped with the vertically neighboring internal electrode layer.

8. The method according to claim 7, wherein the printing of the internal electrode patterns includes printing the internal electrode patterns so that the portion of the internal electrode pattern being not to be overlapped has a width narrower than that of the portion of the internal electrode pattern being to be overlapped so as to have a thickness thicker than that of the portion of the internal electrode pattern being to be overlapped.

9. The method according to claim 8, wherein the printing of the internal electrode patterns includes printing the internal electrode patterns so that the portion of the internal electrode pattern being not to be overlapped has a reduced width that is in a range of approximately 50 to 90% with respect to a width of the portion of the internal electrode pattern being to be overlapped.

10. The method according to claim 8, wherein the printing of the internal electrode patterns includes printing the internal electrode patterns so that the portion of the internal electrode pattern being not to be overlapped has the narrow width so as to have a thickness, that is in a range of approximately 105 to 200% with respect to that of the portion of the internal electrode pattern being to be overlapped, after being printed and dried.

11. The method according to claim 7, wherein the printing of the internal electrode patterns includes primarily printing and drying all of each internal electrode pattern on each dielectric sheet, additionally printing and drying the internal electrode pattern only in the portion of the internal electrode pattern being not to be overlapped so that the portion of the internal electrode pattern being not to be overlapped has a thickness thicker than that of the other portion of the internal electrode pattern.

12. The method according to claim 11, wherein the additionally printing of the internal electrode pattern includes printing the internal electrode pattern only in the portion of the internal electrode pattern being not to be overlapped using a paste containing a reduced metal content.

13. The method according to claim 11, wherein the additionally printing of the internal electrode pattern includes screen printing the internal electrode pattern only in the portion of the internal electrode pattern being not to be overlapped by changing at least one of a pattern, a mesh, and an emulsion film thickness as a screen condition and an impression pressure, a printing speed, a squeegee angle, and a snap-off as a printing operating condition.

14. The method according to claim 11, wherein the additionally printing of the internal electrode pattern includes additionally printing the internal electrode pattern so that after the additionally printing and drying, the portion of the internal electrode pattern being not to be overlapped has a thickness that is in a range of approximately 105 to 200% with respect to a thickness of the other portion of the internal electrode pattern after the primarily printing and drying.

15. The method according to claim 7, wherein the printing of the internal electrode patterns includes printing the internal electrode patterns so that the portion of the internal electrode pattern being not to be overlapped has a thickness thicker than that of the portion of the internal electrode pattern being to be overlapped using a screen having a screen emulsion film thickness corresponding to a section in which the portion of the internal electrode pattern is overlapped with the vertically neighboring internal electrode layer and the other different screen emulsion film thickness corresponding to the other section in which the other portion of the internal electrode pattern is not overlapped.

16. The method according to claim 15, wherein the printing of the internal electrode patterns includes screen printing the internal electrode patterns using a screen having the screen emulsion film thickness corresponding to the non-overlapped section that is in a range of approximately 105 to 200% with respect to the other screen emulsion film thickness corresponding to the overlapped section.

17. The method according to claim 7, further comprising forming a structure in which a plurality of dielectric sheets having the internal electrode patterns printed thereon are stacked and compressing the structure.

18. The method according to claim 17, wherein after printing a plurality of internal electrode patterns on a single dielectric sheet and compressing a structure in which a plurality of dielectric sheets having the plurality of internal electrode patterns printed thereon are stacked, the method further comprises cutting the compressed structure so that the external electrodes are formed on both sides thereof.

* * * * *

UNITED STATES PATENT AND TRADEMARK OFFICE
CERTIFICATE OF CORRECTION

| | | |
|---|---|---|
| PATENT NO. | : 8,587,920 B2 | Page 1 of 1 |
| APPLICATION NO. | : 13/480129 | |
| DATED | : November 19, 2013 | |
| INVENTOR(S) | : Jae Joon Lee et al. | |

It is certified that error appears in the above-identified patent and that said Letters Patent is hereby corrected as shown below:

On the title page of the patent, under Item "(73) Assignee", please change

"Samsung Electr-Mechanics Co., Ltd.," to Samsung Electro-Mechanics Co., Ltd.

Signed and Sealed this
Third Day of June, 2014

Michelle K. Lee
*Deputy Director of the United States Patent and Trademark Office*